US008645514B2

(12) United States Patent
Gnanasambandam et al.

(10) Patent No.: US 8,645,514 B2
(45) Date of Patent: Feb. 4, 2014

(54) METHOD AND SYSTEM FOR COLLABORATIVE SELF-ORGANIZATION OF DEVICES

(75) Inventors: Shanmuga-Nathan Gnanasambandam, State College, PA (US); Tracy E. Thieret, Webster, NY (US); Naveen Sharma, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1733 days.

(21) Appl. No.: 11/382,107

(22) Filed: May 8, 2006

(65) Prior Publication Data

US 2007/0260716 A1    Nov. 8, 2007

(51) Int. Cl.
*G06F 15/177*    (2006.01)
*G06F 15/173*    (2006.01)
*G06F 1/24*    (2006.01)
*G06F 9/00*    (2006.01)

(52) U.S. Cl.
USPC ............................. 709/223; 709/221; 713/100

(58) Field of Classification Search
USPC .......... 709/220–224, 226; 370/254–255, 351; 713/1, 100
See application file for complete search history.

(56) References Cited

U.S. PATENT DOCUMENTS

| 5,796,951 | A | * | 8/1998 | Hamner et al. ................ 709/223 |
| 5,850,592 | A | * | 12/1998 | Ramanathan ..................... 455/7 |
| 5,960,439 | A | * | 9/1999 | Hamner et al. ....................... 1/1 |
| 6,307,965 | B1 | * | 10/2001 | Aggarwal et al. ............. 382/225 |
| 7,035,240 | B1 | * | 4/2006 | Balakrishnan et al. ....... 370/338 |
| 7,171,476 | B2 | * | 1/2007 | Maeda et al. ................. 709/227 |
| 7,251,222 | B2 | * | 7/2007 | Chen et al. ..................... 370/256 |
| 7,996,510 | B2 | * | 8/2011 | Vicente ......................... 709/223 |
| 2002/0019826 | A1 | * | 2/2002 | Tan ............................... 707/102 |
| 2002/0169846 | A1 | * | 11/2002 | Chen et al. ..................... 709/209 |
| 2002/0184304 | A1 | * | 12/2002 | Meade et al. ................. 709/203 |
| 2003/0030842 | A1 | * | 2/2003 | Suyehira ....................... 358/1.15 |
| 2003/0055931 | A1 | * | 3/2003 | Cravo De Almeida et al. ............................. 709/223 |
| 2003/0117966 | A1 | * | 6/2003 | Chen ............................. 370/255 |
| 2003/0151513 | A1 | * | 8/2003 | Herrmann et al. ......... 340/573.1 |
| 2003/0221004 | A1 | * | 11/2003 | Stupek et al. ................. 709/224 |
| 2004/0018839 | A1 | * | 1/2004 | Andric et al. ................. 455/433 |
| 2004/0107188 | A1 | * | 6/2004 | Hardcastle ........................ 707/3 |
| 2004/0128669 | A1 | | 7/2004 | Furst et al. |
| 2004/0218201 | A1 | * | 11/2004 | Lermant et al. ............. 358/1.13 |
| 2005/0004974 | A1 | * | 1/2005 | Sharma et al. ............... 709/202 |
| 2005/0018611 | A1 | * | 1/2005 | Chan et al. .................... 370/241 |
| 2005/0097198 | A1 | * | 5/2005 | Getler et al. .................. 709/223 |
| 2005/0132154 | A1 | * | 6/2005 | Rao et al. ...................... 711/162 |
| 2005/0138552 | A1 | * | 6/2005 | Venolia ......................... 715/526 |

(Continued)

FOREIGN PATENT DOCUMENTS

WO    WO 2009104171 A2 *   8/2009    ............ H04W 84/20

*Primary Examiner* — Joseph Avellino
*Assistant Examiner* — James Baron
(74) *Attorney, Agent, or Firm* — Fox Rothschild LLP

(57) ABSTRACT

Methods and systems for automatically organizing devices in a network are disclosed. Information may be collected for a plurality of devices in a predetermined area over a predetermined period of time. The information may include device location information and device information for one or more user groups. Each user group may include one or more users. An average preference for each user group may be determined for each device based on the device usage information. The plurality of devices may be organized automatically into a plurality of clusters based on at least the determined average preferences. Each cluster may include one or more devices.

19 Claims, 2 Drawing Sheets

(56) References Cited

U.S. PATENT DOCUMENTS

| | | |
|---|---|---|
| 2005/0188091 A1* | 8/2005 | Szabo et al. .................. 709/227 |
| 2006/0036344 A1* | 2/2006 | Liu et al. ......................... 700/96 |
| 2006/0198346 A1* | 9/2006 | Liu et al. ....................... 370/338 |
| 2006/0235955 A1* | 10/2006 | Chen et al. .................... 709/223 |
| 2006/0248178 A1* | 11/2006 | Thieret ......................... 709/223 |
| 2006/0253570 A1* | 11/2006 | Biswas et al. ................. 709/224 |
| 2007/0022189 A1* | 1/2007 | Nguyen et al. ................ 709/223 |
| 2007/0087756 A1* | 4/2007 | Hoffberg ....................... 455/450 |
| 2007/0106656 A1* | 5/2007 | Gutta ................................ 707/5 |
| 2007/0127063 A1* | 6/2007 | Fertlitsch et al. ............ 358/1.15 |
| 2007/0133040 A1* | 6/2007 | Tredoux et al. .............. 358/1.15 |
| 2007/0260716 A1* | 11/2007 | Gnanasambandam et al. ............................. 709/223 |
| 2009/0024728 A1* | 1/2009 | Russell ......................... 709/223 |

* cited by examiner

METHOD AND SYSTEM FOR COLLABORATIVE SELF-ORGANIZATION OF DEVICES

BACKGROUND

1. Technical Field

The disclosure generally relates to organizing devices in a distributed network environment. More particularly, the disclosure relates to automatically organizing devices in a distributed network environment into clusters.

2. Background

Devices in a distributed networking environment may perform a variety of services, such as printing, copying and/or performing other operations with respect to documents.

Within a customer-specified boundary, organizing devices into clusters is conventionally performed by a human administrator. Clusters are generally formed based on the physical proximity and/or capabilities of particular devices. In addition, a perceived need for particular functions can drive cluster formation for particular groups of users, such as a color printer being assigned to a marketing department.

Manually organizing device clusters places a burden on the administrator. In addition, the administrator might not be able to consider whether particular capabilities are available for particular users or user groups, or whether device usage patterns dictate a new arrangement of devices for users or user groups. Moreover, manual clustering can provide inconsistent levels of service because devices can intermittently join or leave the network. For example, a device may leave a network because of a software and/or hardware failure. In addition, a device may be unavailable if excessive load occurs on a device. Conversely, a device may join a network after it recovers from a failure or if it is connected to a network for the first time.

A concern of many network administrators is the security of the internal network. A system that permits a plurality of devices to communicate across a firewall poses a security risk. Conventionally, each device in a network can contact a remote monitoring system, such as an edge-host, external to the local network. As such, multiple potential points of failure can arise. Monitoring each potential point of failure can be overwhelming or unmanageable for a network administrator to perform.

In addition, usage information for devices in a network is generally not examined. As such, human administrators typically do not consider either the dynamic usage patterns of users or users' willingness to make trade-offs, such as accepting a reduced print speed and/or a less proximate device in order to receive an increase in the print quality of the output documents. Other trade-offs, such as requesting specific qualities for a document production that are only achievable using one or more particular devices, are also typically not considered. Ignorance of such information can result in an administrator being unable to correlate usage of a device with factors that a customer might value, such as it proximity to a device, print quality, print speed and/or a job completion guarantee.

Idle devices in a network represent an inefficient use of resources. When a device is idle, the device has the capability of assisting with other document operations, management functions, diagnostics and/or other computational functions. Currently, no framework is available that utilizes device idle time effectively while being non-invasive to customer requests. Current methods lack the ability to bundle and dispatch aforementioned jobs when faced with sudden customer demand. Although each user can access a static cluster configuration, such access does not guarantee the efficient usage of the cluster and does not foster collaboration across clusters, which can lead to additional idle time.

Other concerns include an inability of current device network architectures to multicast relevant downloads from a service provider and/or to upload aggregated information in a batch job to a service provider. Such information may include diagnostic requests, diagnostic reports and/or maintenance reports. Other information can also be included within such download/upload transfers.

What is needed is a system and method that enable devices in a document services network to self-organize.

A need exists for a system and method that reduce the time, effort and expense of organizing devices in a document services network.

A need exists for a system and method for organizing devices in a way that improves the overall security of a document services network.

A need exists for a system and method that analyze device usage information to appropriately assign service requests based on user-defined parameters and device availability.

A need exists for a system and method that reduce device idle time in a document services network.

A further need exists for a system and method that enables control information to be efficiently uploaded to and downloaded from a remote system in a device-controlled batch process.

The present embodiments are directed to solving one or more At the above-listed problems.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "device" is a reference to one or more devices and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of the present invention, the preferred methods, devices, and materials are now described. All publications mentioned herein are incorporated herein by reference. Nothing herein is to be construed as an admission that the invention is not entitled to antedate such disclosure by virtue of prior invention.

In an embodiment, a method of automatically organizing devices in a network may include collecting information, including device location information and device usage information for one or more user groups each, for a plurality of devices in a predetermined area over a predetermined period of time, determining an average preference for the one or more user groups for each device based on the device usage information, and automatically organizing the plurality of devices into a plurality of clusters based on at least the determined average preferences. Each user group may include one or more users. Each cluster may include one or more devices.

In an embodiment, a system for processing service requests may include a communications network, a plurality of user terminals, each in communication with the communications network, and a plurality of devices. Each device may include a device agent, and a communications interface in communication with the processor and the communications network. The device agent may communicate with at least one device agent for another device via the communications interface. A first device may further include a processor, and a processor-readable storage medium, in communication with the processor, containing one or more programming instructions for performing a method of automatically organizing the plurality of devices. The method may include collecting information, including device location information and device usage information for one or more user groups each, for a plurality of devices in a predetermined area over a predetermined period of time, determining an average preference for the one or more user groups for each device based on the device usage information, and automatically organizing the plurality of devices into a plurality of clusters based on at least the determined average preferences. Each user group may include one or more users. Each cluster may include one or more devices.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
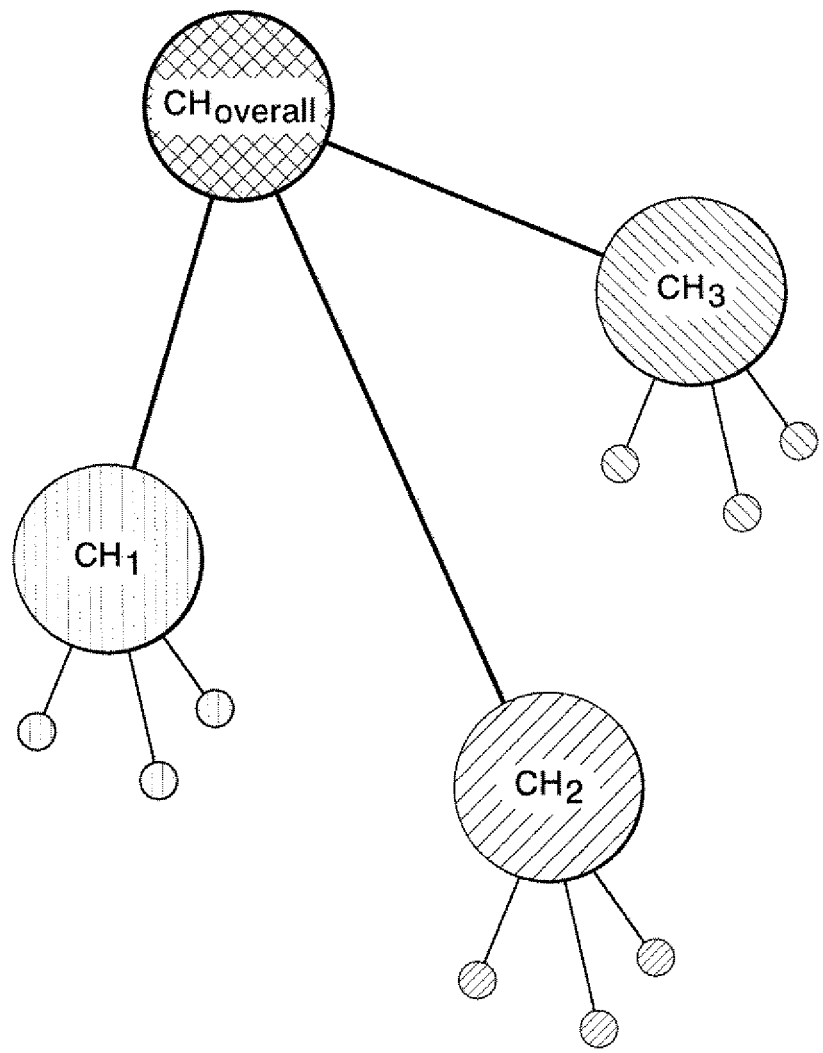
FIG. 1 depicts an exemplary logical hierarchy of clustered devices according to an embodiment.

A self-organizing device system architecture and a method of organizing the same into a plurality of clusters are disclosed. The proposed systems and methods may be used to replace the manual clustering of, for example, devices used to provide document services. Accordingly, the burden of organizing clusters may be removed from information technology personnel and/or other system administrators. Instead, an adaptive, dynamic and configurable algorithm may divide a plurality of devices into a plurality of clusters automatically. In addition, cluster heads may be automatically selected for each cluster, and an overall device based proxy ("$CH_{overall}$") may be automatically selected that is responsible for cross-firewall communication. Each of the cluster heads and the $CH_{overall}$ may be dynamically reassigned based upon device and network conditions over time.

Clusters may be formed based on one or more attributes, such as the proximity of a user group to devices selected for a cluster and the preferences for each user within the user group. A user group may include one or more users. The preferences may be automatically determined based on each user's usage patterns over time. Clusters of devices may initially be organized based on, for example, physical location. The clustering may subsequently be improved by overlaying usage data from, for example, device logs.

By properly organizing clusters, numerous benefits may occur. For example, devices may dynamically and automatically self-organize into clusters.

In an embodiment, network security may also be improved. Network security may be improved if only one device, such as $CH_{overall}$, is responsible for communications through a firewall. The selection of $CH_{overall}$ may be dynamically determined by one or more devices through an election process.

Moreover, an automatic cluster organization process may consider users' document service preferences. An interface may be constructed to inform a user of the trade-offs at the time of printing (e.g., time to print, quality of print and print features for each of one or more clusters may be displayed).

Additionally, device idle time may be used to effectively balance service, management and/or diagnostic jobs within and outside of each cluster. Multicast and batch processing may also be performed using devices in one or more clusters.

Dynamic self-organization of a plurality of devices operating within a customer-specified boundary may form autonomous clusters and logical relationships between the clusters and/or devices to efficiently allocate document requests. The process of self-organization may use information about each device and the nature of each device's interaction with an existing user base. Each device may be embedded with a self-aware agent, such as the XPresso™ agent from Xerox Corporation. An exemplary agent and an exemplary apparatus using such an agent are described in U.S. patent application Ser. No. 10/687,244 entitled "Device Model Agent," filed Oct. 16, 2003, and U.S. patent application Ser. No. 10/687,142 entitled "Apparatus for Low Cost Embedded Platform for Device Side, Distributed Services Enablement," filed Oct. 16, 2003, respectively, each of which is incorporated herein by reference in its entirety. As such, collaboration may result in the formation of a cohesive and adaptive multi-agent system. This system may be used to leverage the peer-awareness gained by collaboration and the knowledge from users, document service preferences as implicitly contained in one or more device logs to organize devices in a network.

FIG. 1 depicts an exemplary logical hierarchy of clustered devices according to an embodiment. An arbitrary number of devices (N) may be clustered into an arbitrary number of cluster groups (k). As shown in FIG. 1, thirteen devices are clustered into four cluster groups. A self-organization algorithm may be performed by the devices periodically or continuously to ensure that the devices are clustered into groups. In an embodiment, the number of devices may fluctuate over time as devices power up or power down. Moreover, the number of clusters may also change intermittently.

Each of the k clusters may select a device within the cluster to be a cluster head ($CH_i$, where i=1, 2, ..., k) The selection of the cluster head may be based on, for example, resource availability. The cluster heads, in turn, may select the $CH_{overall}$ to perform cross-firewall communication. The selection of the $CH_{overall}$ may also be based on, for example, resource availability. The process may result in the formation of a logical hierarchy that enforces the roles and functionalities desired from a self-organizing cluster of devices.

Other methods for selecting $CH_i$'s and the $CH_{overall}$ may be performed within the scope of this disclosure. For example, the $CH_{overall}$ may be selected from devices that are not cluster heads. In addition, other criteria may be used to select the $CH_i$'s and the $CH_{overall}$. In an embodiment, additional hierarchical levels may be used to organize devices within the scope of this disclosure.

In an embodiment, each cluster may be associated with a neighborhood based on, for example, the physical location of a cluster. In an embodiment, only adjacent clusters may be considered neighbors. In an embodiment, neighbors may be adjacent vertices in a Delaunay triangulation of the clusters. A neighborhood may be an abstract concept used to reduce the complexity of the clustering algorithm. For example, when attempting to improve a particular clustering, additions to a particular cluster may be selected only from neighboring clusters.

Devices may exhibit peer-awareness by sharing information and knowledge. In an embodiment, such information may relate to physical device locations, device log information regarding usage of each device and dynamic information. A device location may be determined, for example, by a specialized device, such as a global positioning system, and/or by configuration. Device log information may include information regarding usage of a device by one or more users and/or user groups. Dynamic information may include, for example, CPU utilization, available resources, data in non-volatile memory and/or events for a device. Knowledge regarding, for example, user-device preferences, users' proximity to devices and/or device capabilities may be implicitly contained within device logs.

One or more policies may be implemented within a device network. For example, a cluster usage policy may be enforced. The cluster usage policy may require that the average usage of each cluster by its associated user-group be no less than a usage threshold $\rho$. The average usage of a cluster or device may be measured by an average preference metric determined by the average selection probability of users that prefer the cluster (Average Cluster Preference or "ACP") or device as determined from the corresponding device logs. Membership of a device in a particular cluster may be dynamic. Membership may be determined at least in part by the usage threshold $\rho$.

In an embodiment, a capability policy may be implemented. Over time, one or more of the roles of the $CH_i$'s and the $CH_{overall}$ may be assumed by different devices based on the available resources at the time of the selection or re-selection. In other words, when the (re)selection of a $CH_i$ and/or the $CH_{overall}$ is performed, a device that is capable of performing the computational requirements of the particular role may be selected. Capability may be measured as a fitness function (i.e., a normalized linear combination of static and dynamic attributes with configurable weights). Static attributes may include the CPU power of a device, the print capabilities of a device and whether the device has a connection to an edge host for cross-firewall communications (in the case of the $CH_{overall}$). Dynamic attributes may include the current usage of the device and whether additional processes are queued for service by the device and/or its cluster.

In an embodiment, a utility function policy may be implemented. The policy may enable a user to select, for example, one of source routing or dynamic job allocation for a particular request. A source routing request may refer to a direct selection of a particular device by a user. A dynamic job allocation request may enable the device network and/or associated software to assist the user in selecting one or more devices for fulfilling the request. For example, the user may be presented with one or more suggestions and/or trade-offs when submitting a dynamic job allocation request. The trade-offs may include, for example, print quality, speed, device location and/or a particular capability, such as being able to print on paper of a particular size. In an embodiment, one or more trade-offs may be automatically selected based on settings within an application from which the request is sent. For example, if a user is drafting a blueprint and desires to print a final version, a device designed to print blueprints may be selected to complete the service request. Thus, a user's preferences may be represented by a convex utility function that is utilized to dispatch one or more service requests to desired or selected printers in an optimized manner.

Figure 2:
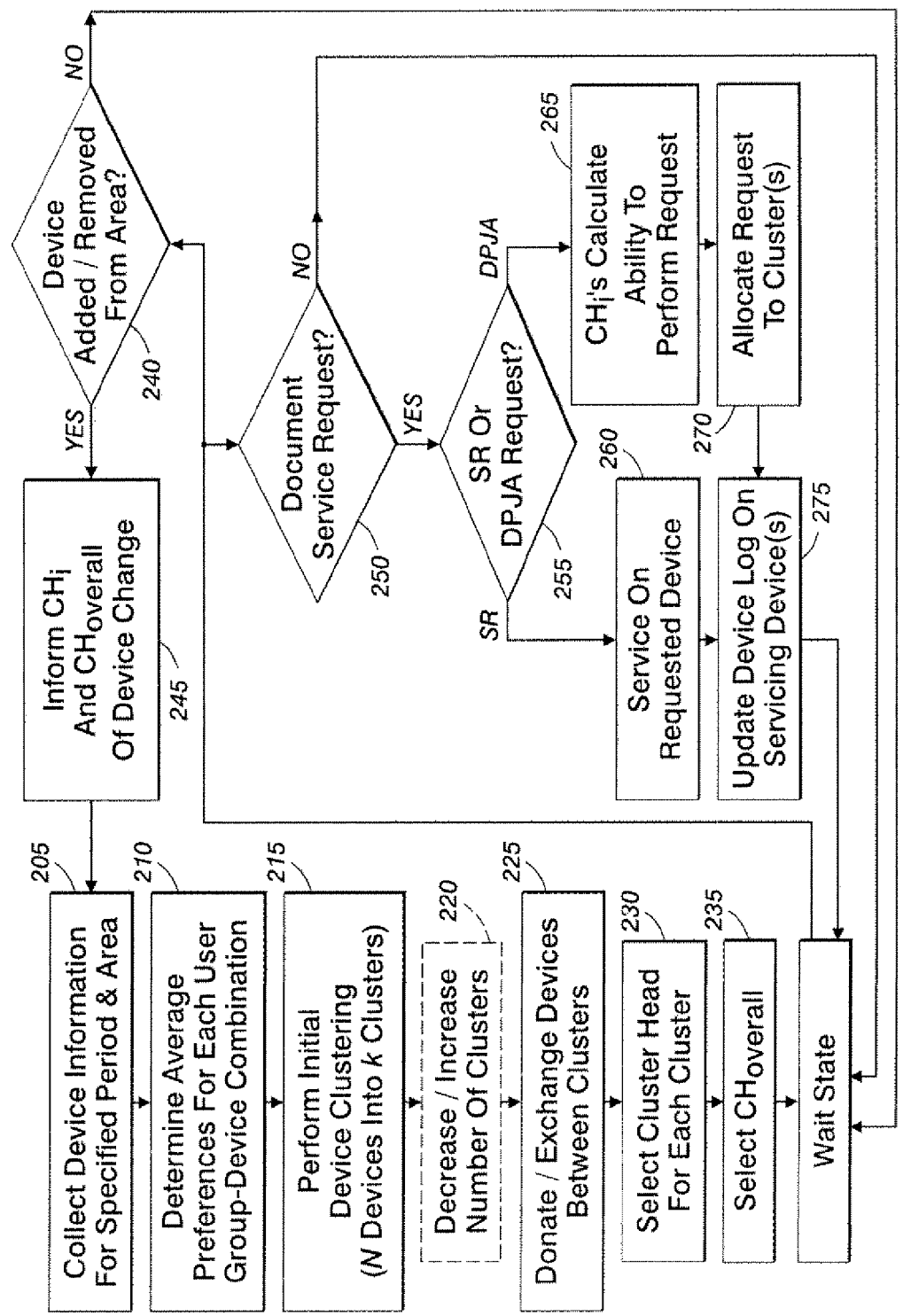
FIG. 2 depicts an exemplary flow diagram for a process of automatically organizing and providing document services using a cluster of devices according to an embodiment.

FIG. 2 depicts an exemplary flow diagram for a process of automatically organizing and providing document services using a cluster of devices according to an embodiment. Initially, an administrator may specify 205 a period and an area over which location and usage information is gathered.

Location information may be determined for one or more devices located in the area, which may include a subnet, a building network, an intranet and/or any other network or portion thereof. In an embodiment, a device may gather location information by accessing one or more other devices in a network. Location information may be configured by an administrator and/or determined by the device via a positioning system Other methods of discovering device information may also be performed within the scope of this disclosure as will be apparent to those of ordinary skill in the art.

In an embodiment, usage information may be gathered from device logs maintained by and/or for the one or more devices within the area for which location information is identified. The period may be a time frame over which the average utility of each device in the area is determined. The average utility of a device may refer to how often users use a particular device.

A single device may perform the collection of location, usage and/or other information. For example, one or more devices in the network may select an arbitrary device to determine the information. In an embodiment, $CH_{overall}$ (once selected) may be used to determine the information. Alternately, an administrator may select a device to determine the location and usage information. In an embodiment, an arbitrary device may be selected to determine the location and usage information In an embodiment, information pertaining to a device may be stored remotely from the device to which it pertains. For example, information pertaining to a device may be stored at a server, such as a print server.

The assembled information for each device in the area may be examined for the relevant period to determine 210 an average preference for each user's usage of each device. As such, the average preference for a particular device and a particular user may equal the number of times the user has used the particular device during the period divided by the total number of times the user has used any device in the area during the period. In an embodiment, average preferences may be determined 210 for a plurality of users (i.e., a user group) instead of a single user. Other methods for analyzing the collected information may be performed and other metrics may be determined within the scope of this disclosure.

Initial device clustering may then be performed 215. In an embodiment, N devices identified in an area may be organized 215 into k clusters. In an embodiment, k may be between 2 and N−1, inclusive. The initial clustering of the N devices may be based on, for example, the location of the devices. Other information, such as services provided by each device, interoperability between devices and the like, may also be used to initially cluster devices.

In an embodiment, the initial clusters may be adjusted in order to satisfy one or more requirements. For example, the number of clusters may be increased or decreased 220 from the initially selected value for k. In an embodiment, the number of clusters may be increased 220 as long as each resulting cluster satisfies one or more constraints.

The device selection probabilities for each device in a cluster may be used to calculate an average cluster preference ("ACP"). The ACP for a cluster may relate to the expected usage of the cluster based on past usage statistics. In an embodiment, the ACP for each cluster may be required to exceed a usage threshold $\rho$. As such, the number of clusters may be increased 220 provided each resulting cluster satisfies the usage threshold requirement (i.e., $ACP_i > \rho$, for each $i=1, \ldots, k$). Once the value of k is maximized, the device collecting the information (i.e., the arbitrary device or $CH_{overall}$) may assign a cluster number to each device based on its cluster. In other words, each device in a cluster may be assigned the same cluster number.

In an embodiment, clusters may be assigned so as to substantially equalize the ACP for each cluster. For example, if a network is organized into five clusters, each cluster may have an ACP that is approximately 20% of the jobs performed by all devices in the network.

In an embodiment, another metric used to determine one or more clusters may include the percentage of idle time expected based on past usage statistics.

In an embodiment, clusters may engage in a donation-exchange process 225 to improve the ACP for each cluster. In an embodiment, the donation-exchange process 225 may be used to maximize the ACP for each cluster. In an embodiment, the donation-exchange process 225 may be used to substantially equalize the ACP for each cluster. The donation-exchange process 225 may allow a cluster to donate and/or exchange resources with a neighboring cluster. The process 225 may be performed iteratively to enhance the ACP of each cluster. As such, logical clusters may be formed that have high ACP values In an embodiment, one or more constraints, such as a minimum cluster size µ (i.e., the minimum number of devices permissible in each cluster) and the usage threshold $\rho$, may be required to be satisfied during the donation-exchange process 225.

Cluster numbers assigned to particular devices may be reassigned if such devices are transferred to a new cluster. In an embodiment, cluster numbers may only be assigned after the donation-exchange process completes. In an embodiment, the number of clusters may be adjusted 220 after the donation-exchange process 225 completes. The adjustment of the number of clusters and the donation-exchange process may be performed iteratively.

Once devices are assigned to a cluster and the number of clusters is determined, a cluster head may be selected 230 for each cluster. In an embodiment, a fitness function may be used to select 230 a cluster head. The fitness function may include a combination of dynamic and static attributes. Dynamic attributes may include, for example and without limitation, device utilization, available resources and the like. Static attributes may include, for example and without limitation, the Media Access Control ("MAC") addresses for each device. One or more static attributes may be used, for example, as a tiebreaker and/or to distinguish devices from each other.

In an embodiment, a linear combination of attributes may be used to select 230 a cluster head. By using a linear combination of attributes, a system administrator may configure weights to reflect one or more perceived needs in the network. For example, device utilization may be used to determine a "fittest" device because devices with lower utilization may be more capable of fulfilling the computational requirements required of a cluster head.

Devices within a particular cluster may select 230 the cluster head for the cluster. In an embodiment, devices within each cluster may autonomously perform the selection process. The $CH_i$'s may be registered, for example, with a print server for each user in the network.

In an embodiment, the cluster heads for each cluster may select the $CH_{overall}$. In an embodiment, one or more other devices may additionally or alternately select $CH_{overall}$.

In an embodiment, a new $CH_i$ may be selected for a particular cluster and/or a new $CH_{overall}$ may be selected intermittently. In an embodiment, a device that previously acted as a cluster head and/or the $CH_{overall}$ may be designated as a backup and may retain some state information as well. This may enable a more reliable selection mechanism if a random or unanticipated failure occurs.

The $CH_{overall}$ may control 235 subsequent administration of the cluster reorganization process. In an embodiment, a cluster reorganization process may be initiated if a device is added to or removed from the network. The cluster reorganization process may include steps 205-235 listed above. Other methods of cluster reorganization, including alternate; additional and/or reordered steps, may be performed within the scope of this disclosure.

In an embodiment, the $CH_{overall}$ may be responsible for communicating with one or more systems outside the device network. The $CH_{overall}$ may serve as a proxy for other devices in the network. Communication may include receiving status requests, information downloads and the like from the remote monitoring device, and providing status updates, diagnostic reports and/or metering information to a remote monitoring device. Information to be communicated by the $CH_{overall}$ may be received from one or more devices in the network. In an embodiment, the $CH_{overall}$ may receive information pertaining to devices in a cluster from the cluster head for that cluster. In an alternate embodiment, the $CH_{overall}$ may directly communicate with one or more devices in the cluster.

One or more devices may monitor one or more other devices to determine 240 whether a new device is added to the network and/or a device is removed from the network. A device may be added to the network when a device is connected to the clustered network of devices. A device may be removed by, for example, powering down the device and/or when a device failure occurs. A device may either announce its new status or allow its status to be discovered passively. If a device has been added or removed from the network, the detecting device may report 245 the new/removed device to its cluster head, which may forward the information to the $CH_{overall}$. The $CH_{overall}$ may refresh the gathered information to reflect the addition or deletion of the device. In an embodiment, the $CH_{overall}$ may decide to initiate a cluster reorganization process as described above.

An alternate determination may be made 250 as to whether a document service request is received from a user. If a document service request is received, a determination of whether the document service request is, for example, a source route request or a dynamic print job allocation request may be made 255.

If the document request is a source route request, the request may be serviced 260 by a device specified in the document request, and the device log for the specified device (with respect to the requesting user) may be updated 265. In an embodiment, a device log may be maintained for each device, cluster, sub-network and/or network including user information for a plurality of requests.

If the document request is a dynamic print job allocation request, one or more of the $CH_i$'s may calculate 270 the ability of their corresponding clusters to perform the request based on one or more parameters. In an embodiment, only $CH_i$'s identified by the requesting user and/or which are associated with a user terminal may perform such computations The service request may be allocated 275 to the cluster that maximizes the benefit to the user based on a utility function policy. In an embodiment, such a policy may be performed as follows. Initially, clusters that are incapable of performing the service request may be eliminated. For example, if a service request requires that a color print of a document be made and no device in a particular cluster is capable of producing a color document, the cluster head may eliminate the cluster from consideration. Other parameters or desired features may also be examined within the scope of the present disclosure.

The remaining clusters may be arranged in a decreasing order of print preferences for the requesting user. The appropriate cluster may then be identified by user preferences (if any) and/or one or more other parameters. Within the identified cluster, the service request may be dispatched to a particular device based on availability. In an embodiment, multiple devices within a cluster may complete a service request in parallel. The $CH_i$ for the selected cluster may be responsible for ensuring that the service request completes. Upon completion of the service request, the device log for each device used to process the request may be updated 265 (with respect to the requesting user).

Once the one or more device logs are updated, the process may complete and additional service requests may be processed. In an embodiment, a plurality of service requests may be processed simultaneously. In an embodiment, a service request may include one or more of a print request, a facsimile request, an upload, a download, parallel computation and/or the like. In an embodiment, an automatic reorganization of the clusters may be performed based on updates made to the device logs.

In an embodiment, additional or fewer device levels may be used within a hierarchical cluster organization. For example, devices that monitor one or more cluster heads and are monitored by the $CH_{overall}$ may be included within the scope of the present disclosure. In an alternate embodiment, a plurality of proxies may be selected. Each proxy may perform functions of $CH_{overall}$ for a portion of a clustered network. Alternate and other configurations will also be apparent to those of ordinary skill in the art based on the present disclosure.

Numerous advantages may result from automated clustering of devices in a network. As stated above, selecting a $CH_{overall}$ device to communicate with a remote monitoring system may enhance network security because firewall configuration and intrusion monitoring may be easier to perform. In addition, the $CH_{overall}$ may be used to receive information (e.g., device serial numbers and/or service due dates) for particular devices from the remote monitoring device. Such information may be forwarded to the cluster heads, which, in turn, forward the information to the appropriate devices. Likewise, information received from devices via cluster heads may be combined together and sent in aggregate (e.g., in a batch mode transfer) to the remote monitoring device.

In an embodiment, if identical data must be downloaded to one or more devices from a remote monitoring system, the remote monitoring system may perform a single data transfer with the $CH_{overall}$, which may forward the information to the appropriate devices. This may result in a reduction in the amount of data transferred between the remote monitoring system and the $CH_{overall}$. Accordingly, device network security may be improved.

In addition, because the $CH_{overall}$ and $CH_i$ devices are typically selected at least in part based on the amount of available processing power, such devices may likely have sufficient resources to accomplish their roles. Accordingly, such devices may be capable of performing service request assignment and completion, management functions and/or diagnostic execution. Moreover, by performing operations conventionally performed by resource constrained devices, the $CH_i$ and $CH_{overall}$ devices may increase network efficiency by enabling all required functions to be completed without affecting device productivity in a customer detectable way.

Device self-organization may reduce the time, effort and expense of manual device configuration. Furthermore, as the number of devices in a network increases, the ability to manually manage a large-scale topology of devices becomes infeasible. The disclosed embodiments enable the organization of large-scale topologies automatically.

Using domain knowledge to customize an organization of devices using local computational resources further reduces remote configuration costs. By using information about devices and users' usage of such devices that is locally available, a logical overlay network may be constructed to allocate roles using local device resources.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A method of automatically organizing devices in a network, the method comprising:
   collecting, by a processor, information for a plurality of devices in an area over a period of time, wherein the information comprises device location information and device usage information for a user group, wherein the user group comprises one or more users, wherein the device usage information comprises a utilization for each device for the user group, wherein the utilization comprises a measure of how often the users in the user group utilize the device during the period of time;
   automatically organizing, by the processor, the plurality of devices into a plurality of initial clusters based on the device location information associated with the plurality of devices;
   determining, by the processor, an average preference for the user group for each device based on the device usage information, wherein the average preference comprises the measure of how often the users in the user group utilize the device during the period time divided by a non-zero measure of how often the users in the user group utilize any device in the plurality of devices during the time period;
   automatically adjusting, by the processor, the initial clusters to create a plurality of adjusted clusters such that each adjusted cluster is associated with a substantially equal average preference, wherein the average preference associated with each adjusted cluster exceeds a usage threshold value, wherein each adjusted cluster includes one or more devices.

2. The method of claim 1 wherein automatically adjusting the initial clusters comprises reassigning a device from a first cluster to a second cluster.

3. The method of claim 1 wherein automatically adjusting the initial clusters comprises exchanging a first device from a first cluster with a second device from a second cluster.

4. The method of claim 1, further comprising wherein automatically adjusting the initial clusters comprises:
   determining whether the average preference for each cluster in the plurality of initial clusters exceeds the usage threshold value, wherein the plurality of devices were organized into a first number of clusters; and
   if not, automatically organizing the plurality of devices into a second number of clusters, wherein the second number is greater than the first number.

5. The method of claim 1, further comprising:
   automatically selecting a plurality of cluster heads, wherein a cluster head is selected for each adjusted cluster, wherein a cluster head is selected from the one or more devices in a cluster; and automatically selecting an overall device based proxy.

6. The method of claim 5 wherein the cluster head is selected by the one or more devices in the adjusted cluster for which the cluster head is selected.

7. The method of claim 5 wherein the overall device based proxy is selected by one or more cluster heads.

8. The method of claim 5 wherein the overall device based proxy is selected from the plurality of cluster heads.

9. The method of claim 5 wherein the automatic adjusting step is performed by the overall device based proxy.

10. The method of claim 1, further comprising:
detecting whether a device has been removed from the area; and
if a device has been removed from the area, automatically reorganizing one or more devices in the area.

11. The method of claim 1, further comprising:
detecting whether a device has been added to the area; and
if a device has been added to the area, automatically reorganizing one or more devices in the area.

12. The method of claim 1, further comprising:
processing one or more service requests using at least one device, wherein information pertaining to the service request is stored in one or more device usage logs; and
automatically reorganizing one or more devices based on the information stored in the one or more device usage logs.

13. A system for processing service requests, the system comprising:
a communications network;
a plurality of user terminals, each in communication with the communications network; and
a plurality of devices, wherein each device comprises:
a device agent, and
a communications interface in communication with the processor and the communications network,
wherein the device agent communicates with at least one device agent for another device via the communications interface,
wherein a first device further comprises:
a processor, and
a non-transitory processor-readable memory, in communication with the processor, wherein the processor-readable memory contains one or more programming instructions that, when executed, cause the processor to:
collect information for the plurality of devices in an area over a period of time, wherein the information comprises device location information and device usage information for a user group, wherein the user group corresponds to one or more user terminals, wherein the device usage information comprises a utilization for each device by the user group, wherein the utilization comprises a measure of how often the users of the user group utilize the device during the period of time,
automatically organize the plurality of devices into a plurality of initial clusters based on the device location information associated with the plurality of devices,
determine an average preference for each user group for each device based on the device usage information, wherein the average preference comprises the measure of how often the users of the user group utilize the device during the period time divided by a non-zero measure of how often the users of the user group utilize any device in the plurality of devices during the time period, and
automatically adjust the initial clusters to create a plurality of adjusted clusters such that each adjusted cluster is associated with a substantially equal average preference, wherein the average preference associated with each adjusted cluster exceeds a usage threshold value, wherein each adjusted cluster includes one or more devices.

14. The system of claim 13 wherein the processor-readable memory further contains one or more programming instructions that, when executed, cause the processor to:
detect whether a device has been removed from the area; and
if a device has been removed from the area, automatically reorganize one or more devices in the area.

15. The system of claim 13 wherein the processor-readable memory further contains one or more programming instructions that, when executed, cause the processor to:
detect whether a device has been added to the area; and
if a device has been added to the area, automatically reorganize one or more devices in the area.

16. The system of claim 13 wherein the processor-readable memory further contains one or more programming instructions that, when executed, cause the processor to:
process one or more service requests using at least one device, wherein information pertaining to the service request is stored in one or more device usage logs; and
automatically reorganize one or more devices based on the information stored in the one or more device usage logs.

17. The system of claim 13, further comprising a remote monitoring system, wherein the remote monitoring system is in communication with the communications network via a firewall, wherein only the first device is in operative communication with the remote monitoring system.

18. The method of claim 1, wherein collecting information for a plurality of devices comprises collecting the information from a device log associated with one or more of the plurality of devices.

19. The system of claim 13, wherein the one or more instructions that, when executed, cause the processor to collect information for the plurality of devices comprise one or more instructions that, when executed, cause the processor to collect the information from a device log associated with one or more of the plurality of devices.

* * * * *